US009755990B2

(12) United States Patent
Vicaire (10) Patent No.: US 9,755,990 B2
(45) Date of Patent: Sep. 5, 2017

(54) AUTOMATED RECONFIGURATION OF SHARED NETWORK RESOURCES

(71) Applicant: Amazon Technologies, Inc., Reno, NV (US)

(72) Inventor: Pascal A. Vicaire, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/289,468

(22) Filed: Oct. 10, 2016

(65) Prior Publication Data

US 2017/0026309 A1    Jan. 26, 2017

Related U.S. Application Data

(62) Division of application No. 13/468,971, filed on May 10, 2012, now Pat. No. 9,466,036.

(51) Int. Cl.
| | |
|---|---|
| *G06F 15/173* | (2006.01) |
| *H04L 12/911* | (2013.01) |
| *G06Q 10/06* | (2012.01) |
| *G06F 9/44* | (2006.01) |
| *G06F 9/50* | (2006.01) |
| *H04L 29/08* | (2006.01) |
| *G06F 9/455* | (2006.01) |

(52) U.S. Cl.
CPC ............. *H04L 47/70* (2013.01); *G06F 9/44* (2013.01); *G06F 9/5027* (2013.01); *G06Q 10/06* (2013.01); *H04L 67/10* (2013.01); *G06F 2009/4557* (2013.01); *G06F 2009/45562* (2013.01)

(58) Field of Classification Search
USPC .................................................. 709/200, 226
See application file for complete search history.

(56) References Cited

U.S. PATENT DOCUMENTS

| | | | | |
|---|---|---|---|---|
| 8,103,486 B1* | 1/2012 | Rolia | ................... | G06Q 10/04 703/2 |
| 8,458,333 B1* | 6/2013 | Stoica | ................... | H04L 67/104 709/223 |
| 8,620,875 B2* | 12/2013 | Jagota | ................... | G06Q 10/10 707/690 |
| 8,645,394 B1* | 2/2014 | Kolak | ............... | G06F 17/30675 707/748 |
| 8,706,864 B1* | 4/2014 | Brandwine | ......... | H04L 41/5006 709/224 |
| 2004/0044770 A1* | 3/2004 | Messick | .................. | H04L 29/06 709/226 |
| 2005/0015489 A1* | 1/2005 | Whynot | ............ | H04L 29/06027 709/225 |

(Continued)

*Primary Examiner* — Anthony Mejia
(74) *Attorney, Agent, or Firm* — Hogan Lovells US LLP (57) ABSTRACT

A resource manager can adjust the amount of capacity in each of a plurality of resource pools using a combination of proactive and reactive approaches. Targets such as an amount of total capacity and an amount of free capacity can be forecast and periodically compared against actual capacity and usage of the pools. A pool balancing algorithm can be used to shift capacity among pools as needed, in order to provide the targeted amount of capacity for each pool before the capacity is needed. When actual usage varies sufficiently from the forecasted usage on which the targets are based, the resource manager can react by reconfiguring resources as needed.

21 Claims, 4 Drawing Sheets

(56) References Cited

U.S. PATENT DOCUMENTS

| | | | | |
|---|---|---|---|---|
| 2005/0044226 A1* | 2/2005 | McDermott | G06F 3/0605 | 709/226 |
| 2007/0083648 A1* | 4/2007 | Addleman | H04L 12/2602 | 709/224 |
| 2007/0130566 A1* | 6/2007 | van Rietschote | G06F 9/45533 | 718/1 |
| 2007/0143767 A1* | 6/2007 | Attanasio | G06F 9/5061 | 718/104 |
| 2008/0013481 A1* | 1/2008 | Simons | H04L 63/104 | 370/328 |
| 2008/0215414 A1* | 9/2008 | Fehnel | G06F 17/30241 | 705/7.16 |
| 2008/0271039 A1* | 10/2008 | Rolia | G06Q 10/06 | 718/105 |
| 2009/0055382 A1* | 2/2009 | Kerschbaum | G06Q 10/06 | |
| 2009/0119301 A1* | 5/2009 | Cherkasova | G06Q 10/06 | |
| 2009/0239480 A1* | 9/2009 | Rofougaran | H04L 12/40013 | 455/73 |
| 2009/0328050 A1* | 12/2009 | Liu | G06F 9/5088 | 718/104 |
| 2010/0034151 A1* | 2/2010 | Alexiou | H04B 7/022 | 370/329 |
| 2010/0050172 A1* | 2/2010 | Ferris | G06F 9/5072 | 718/1 |
| 2010/0250499 A1* | 9/2010 | McAlister | G06F 11/1471 | 707/679 |
| 2011/0022812 A1* | 1/2011 | van der Linden | G06F 9/5077 | 711/163 |
| 2011/0138051 A1* | 6/2011 | Dawson | G06F 9/5072 | 709/226 |
| 2011/0145392 A1* | 6/2011 | Dawson | G06F 9/5072 | 709/224 |
| 2011/0153826 A1* | 6/2011 | Ananthanarayanan | G06F 11/0709 | 709/226 |
| 2011/0154350 A1* | 6/2011 | Doyle | G06F 9/5044 | 718/104 |
| 2011/0231457 A1* | 9/2011 | Tager | G06F 17/30306 | 707/825 |
| 2012/0096167 A1* | 4/2012 | Free | G06F 9/5011 | 709/226 |
| 2012/0102369 A1* | 4/2012 | Hiltunen | G06F 11/008 | 714/48 |
| 2012/0159523 A1* | 6/2012 | Kulkarni | G06F 9/5061 | 719/328 |
| 2012/0290348 A1* | 11/2012 | Hackett | G06Q 10/06 | 705/7.13 |
| 2013/0042005 A1* | 2/2013 | Boss | G06F 9/5011 | 709/226 |
| 2013/0046906 A1* | 2/2013 | Ripberger | G06F 3/0629 | 710/12 |
| 2013/0191215 A1* | 7/2013 | Metcalf | G06Q 30/02 | 705/14.58 |
| 2013/0219036 A1* | 8/2013 | Gusev | G06F 9/5061 | 709/223 |
| 2013/0275416 A1* | 10/2013 | Thomson | G06Q 10/06393 | 707/723 |
| 2014/0137104 A1* | 5/2014 | Nelson | G06F 9/45558 | 718/1 |
| 2014/0195700 A1* | 7/2014 | Agarwal | G06F 9/4812 | 710/48 |
| 2015/0006211 A1* | 1/2015 | Santos | G06Q 10/0631 | 705/7.12 |
| 2015/0098110 A1* | 4/2015 | Zeng | G06F 3/1211 | 358/1.15 |

* cited by examiner

AUTOMATED RECONFIGURATION OF SHARED NETWORK RESOURCES

CROSS-REFERENCE TO RELATED APPLICATIONS

This is a divisional application of parent U.S. patent application Ser. No. 13/468,971, filed on May 10, 2012, entitled "AUTOMATED RECONFIGURATION OF SHARED NETWORK RESOURCES," which is hereby incorporated herein by reference in its entirety.

BACKGROUND

An increasing number of users are relying on shared resources offered in a multi-tenant environment, such as through part of a "cloud computing" offering: Providers of these resources want to ensure that there is adequate resource capacity available for those users, while minimizing the amount of excess, unused capacity that increases cost and reduces profit for those providers. The amount of capacity needed by the users varies over time, however, and can even vary drastically during the course of a given day. A provider can configure and/or reconfigure certain resources to adjust the types and amount of capacity available at different times. The reconfiguration process can take hours for a given resource, however, such that frequent reconfiguration results in a number of resources being unavailable for a substantial percentage of the time, which still results in undesired cost increases for the providers and reduced capacity for the users.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing access to, and use of, shared resources in a multi-tenant computing environment. In particular, various embodiments can implement a hybrid approach to resource capacity management that includes both proactive and reactive balancing portions. In at least one embodiment, total and free capacity targets are determined for each of a group of resource pools. The targets for these pools can periodically be analyzed and compared against actual capacity and/or usage data for the pools in order to attempt to anticipate customer demand and proactively configure hosts or other such resources. Such a proactive approach can position capacity in appropriate pools up to one week ahead of the anticipated demand in certain embodiments. Since it is not possible to precisely predict customer behavior, however, various embodiments can also react to unanticipated demand by dynamically reconfiguring various hosts. A resource manager or other such component can attempt to rebalance various pools based at least in part upon the forecast free capacity targets. A resource manager can monitor free capacity in all pools in real time, and can reallocate capacity as necessary to keep free capacity at or above the free capacity targets.

Various other applications, processes, and uses are presented below with respect to the various embodiments.

Figure 1:
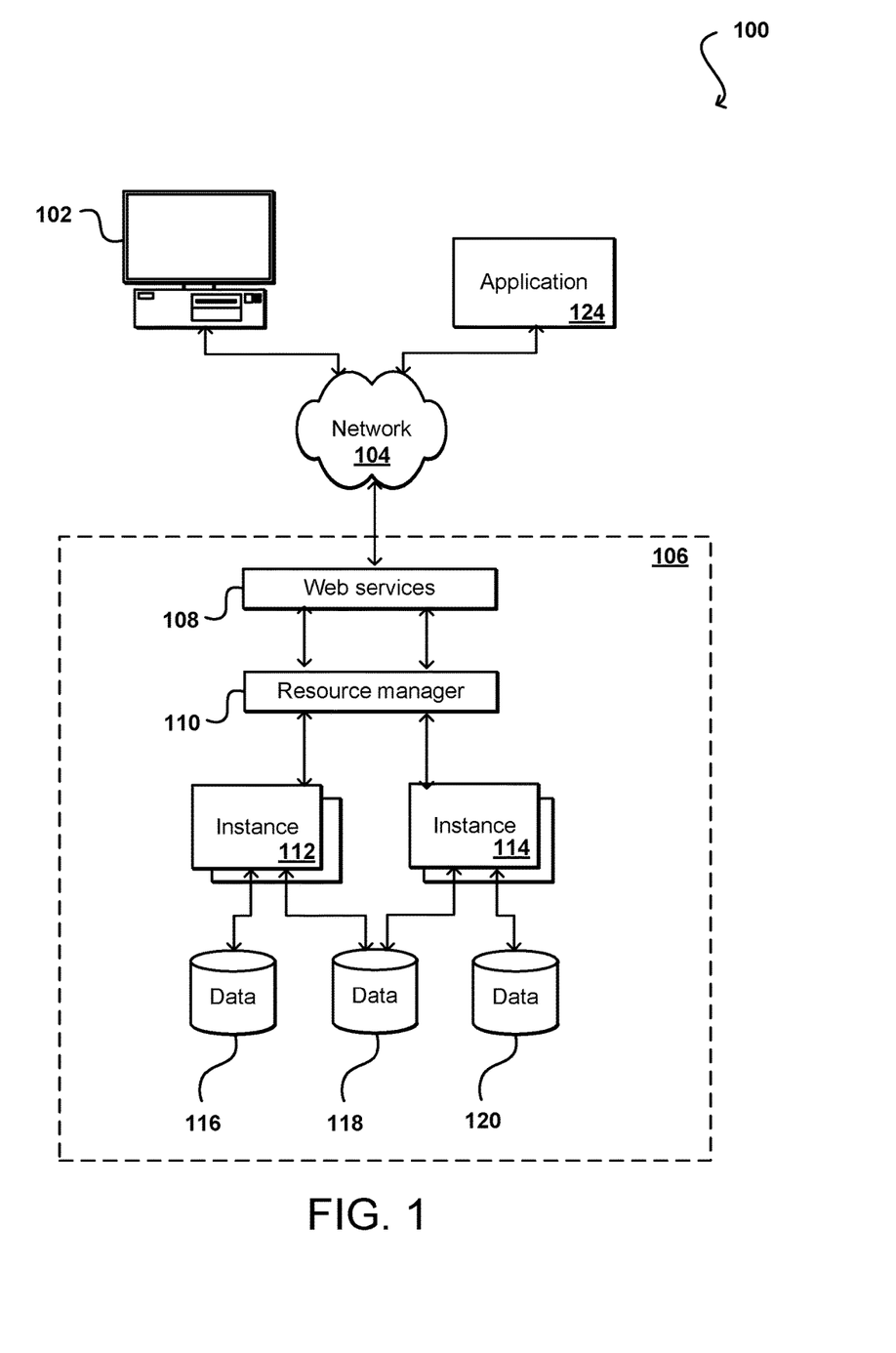
FIG. 1 illustrates a first example environment in which various embodiments can be implemented.

FIG. 1 illustrates an example environment 100 in which aspects of various embodiments can be implemented. In this example, a customer of a resource provider, an application 124, or another such entity is able to access a multi-tenant environment 106 (e.g., a cloud computing environment or other set of shared resources operated by one or more resource providers) across at least one network 104 (e.g., the Internet or a cellular network, using a wired and/or wireless connection) using at least one client device 102. The access can be obtained using, for example, a Web services request sent to an appropriate application programming interface (API) of a Web services layer 108, or other such interface. As known for such purposes, a Web services layer can include any of a number of components, such as Web servers, routing components, load balancers, and the like. In this example, the client device 102 is able to submit one or more requests for capacity from one or more resources or resource instances 110, 112, which can be physical and/or virtual, and may be dedicated or shared among various customers or applications. A client device might utilize a computing instance to perform a computing operation on behalf of the client device, or might utilize a data instance to cause data to be written to, or read from, at least one data store 116, 118, 120, at least a portion of which might be dedicated or reserved for that customer. Various other uses or resources and interactions can occur, and various other components can be utilized, as should be apparent to one of ordinary skill in the art in light of the teachings and suggestions contained herein.

When a request for resource capacity is received, a component or service such as a resource manager 110 can analyze the amount of free capacity in the provider environment. The resources can be distributed across multiple regions, areas, or zones, and the resource manager can determine if there is sufficient capacity in any or all of these zones. If there is sufficient capacity of a type requested by the customer, the resource manager can cause a portion of the resources to be dedicated to that customer for a period of time. This can include, for example, providing dedicated access to one or more slots of one or more host machines in order to enable the customer to run one or more customer instances. If there is not sufficient capacity, the resource manager can attempt to locate additional capacity, such as by reconfiguring one or more host machines, or can deny the request, such as by returning an Insufficient Capacity Exception (ICE). The resource manager can attempt to adjust one or more aspects of the capacity in order to provide the necessary amount of available resource capacity.

As mentioned, however, the amount of resource capacity needed varies overtime, as different numbers of customer use the system at different times, and different customer requests can require different amounts and/or types of resource capacity. When a customer request for capacity is received, a resource manager 110 can use several parameters to determine whether to grant or reject the request. These parameters can include, for example, customer usage patterns, account limits, amount of capacity available, and suspicion of fraud, among other such parameters. The resource manager can also make various high level placement decisions regarding the placement of customer instances. For instance, when a request for capacity in a specific region is made but the request does not specify a particular resource zone, the resource manager can determine an appropriate zone in which to allocate capacity. In at least some embodiments, an amount of capacity can refer to a number of host slots of a particular type. When a customer requests capacity in such an embodiment, the customer is requesting an appropriate number of empty host slots to launch instances. The customer can be provided with one slot capable of providing the full amount of requested capacity, or two or more smaller capacity slots that, when aggregated, provide the requested capacity, where the request is capable of utilizing multiple smaller slots.

It might also be the case that a new server is added to a server rack, a new rack is added to a resource center, or another source of additional capacity is added to a multi-tenant environment. For any such event, a resource manager can determine an appropriate configuration for each host, machine, or other type of resource. A host in one embodiment can be a server operable to run a hypervisor or other virtual machine manager in order to launch one or more instances of one or more operating systems in response to requests from one or more customers. Hosts can be configured using a number of different properties or axis values, such as the type of stack, the hypervisor or virtual machine manager to be used, the addressing type, the instance size, the operating system, and the architecture. A host can be reconfigured from one configuration to another, with the set of possible configurations for a host being constrained by hardware characteristics or other such limitations. In at least some embodiments, a set of hosts with the same or similar configuration in a particular resource zone can be defined as a capacity pool. When a customer submits a request (i.e., via a Web service call to an API) for an amount of resource capacity, the parameters of the request can indicate the configuration that is to be used to launch one or more instances for the request. As discussed, however, it is not possible in most situations to instantly, or even relatively quickly, reconfigure hosts to meet such customer requests. Such a reconfiguration can take from two to six hours as it involves an extensive set of hardware and networking tests, Certain conventional host reconfiguring is performed by opening a ticket in a ticket queue for each pool in which capacity is below a preset threshold. A dashboard can be provided that indicates an amount of capacity left in each pool, as well as historical load and/or capacity data. Processing tickets and manually reconfiguring resources can consume a large part of a capacity team's time and resources. While certain interfaces enable individual hosts to be reconfigured, the task of reconfiguring hosts manually is rapidly becoming unmanageable using such tools, particularly as the sizes of the multi-tenant environments continue to expand.

Other factors can contribute to difficulty in reconfiguring hosts as well. For example, certain hosts are reserved for testing or for specific customers. Further, the hosts can be provided using different types of hardware, and each hardware type can have a different set of possible or "qualified" configurations. When multiple customer instances can be run on a single host, a single running instance can prevent that entire host from being reconfigured. The reconfiguration process also typically is long and prone to failures. Unexpected software bugs on various hosts can suddenly and unexpectedly decrease the amount of capacity available. A resource team might also decide at any time to switch at least some hosts to a "no-launch" mode. While running instances remain operational, no more instances can be launched on these hosts. Even when a configuration is available for a host, the configuration might be avoided to minimize hardware costs or due to customer preferences. Various other factors can lead to difficulty in reconfiguring hosts as well in various environments.

Systems and methods in accordance with various embodiments attempt to address at least some of these and other deficiencies in existing approaches to managing capacity in a multi-tenant environment by attempting to anticipate customer demand and proactively configure hosts or other such resources. In some embodiments, total capacity targets can be specified (i.e. forecast) for each pool, and these targets can be leveraged to allocate new capacity or existing capacity that is out of balance. Such a proactive approach can position capacity in appropriate pools up to one week ahead of the anticipated demand in certain embodiments, Since it is not possible to precisely predict customer behavior, however, various embodiments can also attempt to react to unanticipated demand by dynamically reconfiguring various hosts as well. Free(i.e., available) capacity targets can be specified, and a resource manager or other appropriate component can attempt to rebalance various pools based at least in part upon the forecast free capacity targets. A resource manager can monitor free capacity in all pools in real time, and can reallocate capacity when necessary to keep free capacity at or above the free capacity targets.

Figure 2:
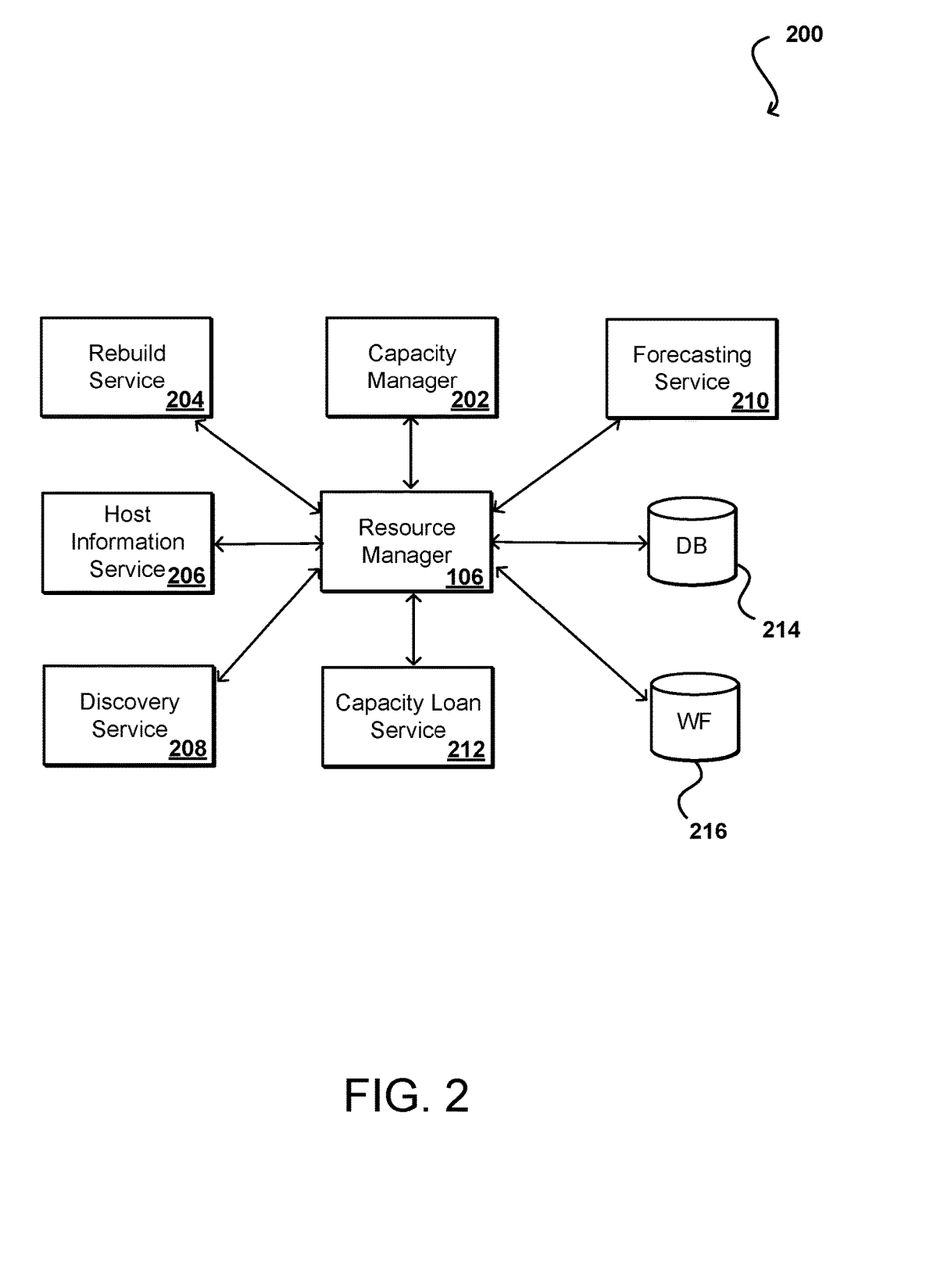
FIG. 2 illustrates example services that can be leveraged by a resource manager in accordance with various embodiments.

FIG. 2 illustrates an example set 200 of components that can be used to provide such functionality in accordance with various embodiments. in this example, the resource manager 106 (as discussed with respect to FIG. 1) can interact with several different components, which each can also be implemented as a respective service in at least some embodiments. The resource manager can interact with a workflow service 216 in order to enable the resource manager to schedule workflows related to host configuration or other such processes. In some embodiments resource capacity can be divided into different hardware families, where each hardware family can be independently balanced. A resource manager can schedule one workflow for each hardware family using the workflow service, which can periodically execute the balancing task for a given family. Using a workflow service, the execution of several tasks can be distributed among multiple hosts, and the workflow can complete successfully even in the event of the failure of some of the hosts.

The resource manager 106 also can utilize a database service 214. The resource manager can have several configuration parameters, such as a configuration parameter that indicates the confidence level of the forecast that is used as a capacity target for each pool. Additionally, the resource manager can have a configuration parameter for each hardware family that indicates whether pool balancing should be performed. The resource manager can store the configuration parameters using a database service, enabling the parameters to be modified through a standard API call. The resource manager also can utilize a capacity manager service 202 to obtain information such as aggregated statistics about current pool capacity. The aggregated statistics can include information such as the current amount of free capacity, the total capacity supply, the current usage, and other such information.

A forecasting service 210 can provide the forecasted total demand, as well as the free capacity target, in order to enable the resource manager to evaluate whether more or less capacity is needed in a given pool. Hosts that are in the process of being reconfigured, however, may not be accounted for in terms of supply or free capacity. To avoid reconfiguring too many hosts, the resource manager can track hosts that are undergoing reconfiguration using a rebuild service 204. Rebuilding a host can include installing the latest software, patches, and/or kernel on the host, and comprehensively tests the host after the install. In many embodiments, it is only possible to rebuild a host when no instances are running on the host. The configuration of a host may be modified when a rebuild is initiated. A rebuild service can also provide a list of valid configurations for any host. While balancing hosts, the resource manager may need to obtain the private addresses (e.g., IP addresses) of the free hosts in that pool. The private address can be used to obtain data about the host such as the list of valid configurations and the number of slots available. The private address can also be used to request that the rebuild service reconfigure a determined host. Such information can be provided by a discovery service 208, which can return the private addresses of corresponding unoccupied hosts when given a query specifying information such as a configuration and a zone. An information service 206 can be used to determine how many slots are available on a given host when balancing pools, in order to maintain accurate accounting. A capacity loan service 212 also can be used while balancing pools to enable the resource manager to ensure that it does not reconfigure reserved hosts, as the loan service can provide information as to whether a given host is reserved. Hosts can be reserved for any of a number of reasons, such as for the testing of new software.

The resource manager 106 can utilize at least one pool balancing algorithm to process the data Obtained from these services. A pool balancing algorithm can take this data as input and provide as output a list of hosts to be reconfigured, as well as a list of hosts that completed the reconfiguration process and are to be made available to customers. The resource manager 106 can then call the rebuild service 204 to reconfigure a host, and can call the information service 206 to make a reconfigured host available to one or more customers. In one embodiment, the pool balancing algorithm can be referred to as a "greedy" pool balancing algorithm. The algorithm can obtain information about several pools, and can order the pools according to their priority, where priority is determined at least in part by how much a given pool needs capacity (e.g., a highest priority pool) or has excess capacity (e.g., a lowest priority pool). The algorithm can select the pool with the highest priority as the target pool, and can search for capacity among the other pools that can be transferred to the target pool. The algorithm can first look to the lowest priority pool, then into the pool with the next highest priority, and so on. The algorithm in this example does not search for capacity in the target pool, or in any pool that has a higher priority than the current target pool. A pool where a host is located that is able to be transferred to the target pool is referred to herein as a source pool. In order to ensure a host can be transferred from the source pool to the target pool, however, a number of checks should be performed. For example, loan service 212 can be contacted to ensure that the host is not reserved. Further, the rebuild service 204 can be contacted to ensure that the host is able to be reconfigured into the configuration of the target pool.

Once a host to transfer is found, the host can be added to a list of hosts to reconfigure and the transfer can be accounted for by reducing capacity statistics in the source pool and increasing capacity statistics in the target pool. To prevent a pool from concurrently acting as both a target and a source pool during execution of the algorithm, any pool that becomes a source pool can be automatically removed from the set of possible target pools, and any pool that becomes a target pool can be removed from the set of possible source pools. In order to make sure that the algorithm terminates, a pool can be removed from the set of possible target pools if the pool becomes a target pool and that no capacity is found to transfer to that pool. These (and any other or alternative) steps can be repeated until the set of possible target pools is empty. At such point, the rebuild service 204 can be cal led with the list of hosts to reconfigure and the list of target configurations.

Pool balancing algorithms in accordance with the various embodiments can take other factors into consideration as well. For example, determining an appropriate balancing of capacity can include making sure that the proportion of the desired free capacity that is met is the same across all pools. A "perfect" balancing of capacity can have some drawbacks, as customers continuously request and release capacity, which could result in the resource manager continually making small adjustments by reconfiguring hosts. Consequently, there would always exist a number of hosts that are being reconfigured, which can be unacceptably wasteful in at least some situations. To address this issue, a resource manager can define a list of balancing levels. For instance the levels could be 10% of the desired free capacity (level 1), 50% of the desired free capacity (level 2), 75% of the desired free capacity (level 3), and 100% of the desired free capacity (level 4). A pool that is below a certain level may only be able to obtain capacity from pools that are at or above that level. For instance, if pool A is below 50% of the desired free capacity for pool A, pool A can only get capacity from a pool B where pool B is above 50% of the desired free capacity for pool B, Utilizing balancing levels is one way to prevent capacity from being reconfigured unnecessarily due to the small and continuously occurring variations in customer usage.

A balancing algorithm can also take into consideration a distinction between logical pools and physical pools. A "logical" pool refers to a set of hosts that have the same configuration as seen by the customer. A "physical" pool refers to a set of hosts that have the same configuration as seen by a database or data service that stores host configuration values. The mapping between logical pools and physical pools is an N-to-N mapping in at least some embodiments, where one logical pool contains multiple physical pools, and one physical pool can be part of multiple logical pools. As an example, a logical pool with a specific addressing can contains both the physical pool with that addressing and the physical pool with unified addressing because customer can use hosts with unified addressing for both NAT instances and instances of that specific addressing. As another example, a physical pool with unified addressing can be both part of the logical pool with NAT addressing and the logical pool with the specific addressing. Forecasting customer demand can be performed at the logical pool level. To satisfy demand in one logical pool, capacity can be transferred to any physical pool that constitutes the logical pool.

Because reconfiguring a host is not instantaneous, it can be important in at least some embodiments to take into consideration hosts that are currently being reconfigured, before deciding to add more hosts to a pool. More specifically, extra capacity may not be added to a pool if enough capacity is already being reconfigured for that pool. The capacity undergoing reconfiguring will eventually become available such that no additional reconfigurations may be needed. On the other hand, capacity might be taken from a pool only if the pool has enough capacity at this time, and capacity that is being reconfigured can be disregarded. If not, a lack of capacity could be created in the pool until the reconfiguration process completes. In situations where an Insufficient Capacity Exception (ICE) is detected in a pool, the resource manager can determine that customers are being impacted by the lack of capacity in that pool. Consequently, the resource manager can give a higher priority to pools where customers experience ICEs. The more customers are impacted in a pool, the higher the priority.

The priority of a pool in at least some embodiments can be calculated by determining the desired free capacity. The desired free capacity can be computed in at least some embodiments using the forecasted demand and the free capacity target, as may be given by:

desired free capacity=max (free capacity target, forecasted demand−actual demand)

In other words, the desired free capacity can be set such that if the free capacity is equal to the desired free capacity, then there is enough supply to satisfy both the free capacity target and the forecasted demand, The resource manager can also determine a pool priority value using a formula such as:

priority value=free capacity*100/desired free capacity

In other words, the priority value can be equal to the percentage of the desired free capacity that is met. If the priority value is 50%, free capacity is equal to half the desired free capacity. If the priority value is 200%, free capacity is equal to twice the desired free capacity. A lower priority value can translate into a higher priority for the pool. For instance, a pool with a priority value of 0% (i.e., not enough supply to meet the desired free capacity target) can have a higher priority than a pool with a priority value of 200% (i.e., enough capacity to meet desired free capacity target).

When balancing the capacity, the resource manager can have various constraints or requirements with which the resource manager might have to comply. For example, the resource manager can monitor capacity continuously and quickly reconfigure hosts according to variations in demand. In practice, however, there is a minimum latency with which a resource manager can reconfigure capacity. The minimum latency can be limited by at least two factors. For example, latency can be limited by the time it takes to query the current state of a server fleet. Fleet queries can take on the order of tens of seconds to execute in some embodiments, depending on factors such as the query and the resource zone. The minimum latency also can be limited by the amount of time it takes to reconfigure hosts. The workflow for reconfiguring a host can run a test suite that takes from two hours to six hours to complete in some embodiments. Considering these limitations, it might be acceptable for a resource manager in one embodiment to reconfigure capacity every five to fifteen minutes. However, should any or all of the aforementioned limitations not be present, a resource manager might be able to monitor and reconfigure capacity on the order of every few seconds.

Various factors limit the accuracy of the pool balancing algorithm as well. For example, the ability to forecast total capacity is limited in that the total demand forecast might only be determined, updated, and/or published periodically, such as hourly, daily, or weekly, which can reduce the accuracy of the forecast at certain times. Further, less capacity may be available because of unexpected events such as delays in rack delivery, broken hardware, or defective software. Also, customer usage can only be predicted with limited accuracy and is subject to the unpredictable behavior of the customers with the largest capacity demands. Various attempts to minimize the variance in behavior can involve letting customers reserve capacity for a future date or by preventing customers from using more capacity than was anticipated by a growth model.

Due at least in part to such limitations, a resource manager in at least some embodiments can be tasked with reactively reconfiguring hosts when the actual demand exceeds the forecasted demand. To do so, a resource manager in at least some embodiments can use published free capacity targets. Still, the free capacity targets and the total demand forecast will not have perfect precision, Several numbers might be published for each forecast, with each number corresponding to a particular confidence level. To select an adequate confidence level, one or more trade-offs can be considered. For example, using a higher confidence level has an advantage that the probability to meet customer demand is higher, and a disadvantage that the probability for capacity to remain unused is also higher. Using a low confidence level has an advantage that the probability for capacity to remain unused is lower, and a disadvantage that the probability to meet customer demand is also lower. The importance of such a trade-off can be affected by various placement decisions. When customers launch instances, for example, a resource manager can select a specific host on which the instance is launched using, for example, a placement algorithm. A placement algorithm can be subject to numerous constraints, such as may include minimizing the cost of software licenses, distributing load among hosts, and preventing all customer instances from being launched on the same host. Consequently, a placement algorithm may not pack instances on as few hosts as possible, and can instead distribute instances among multiple hosts. If all hosts are partially occupied in a pool, it generally will not be possible to reconfigure the hosts to meet demand and remedy low utilization.

Figure 3:
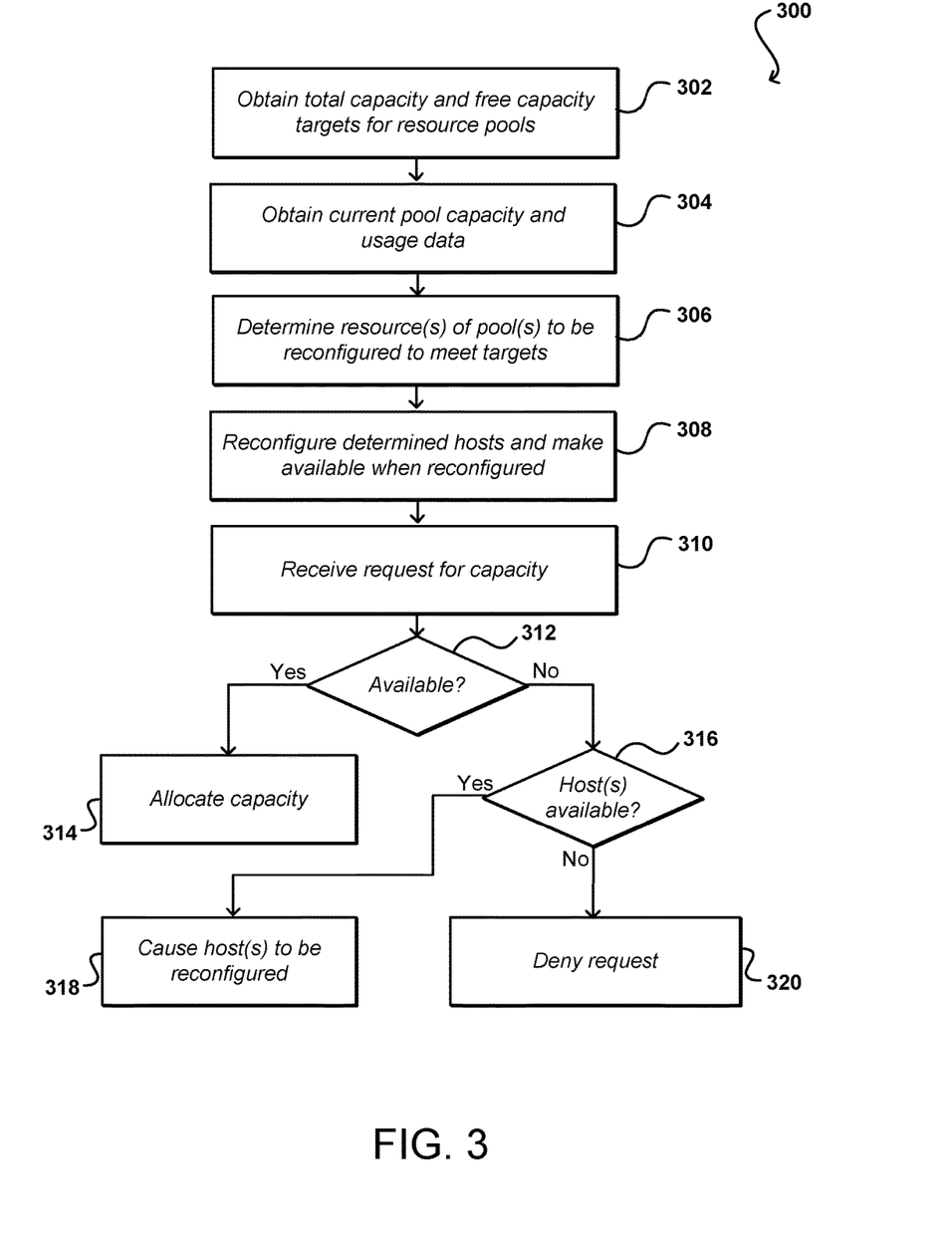
FIG. 3 illustrates an example process for adjusting resource capacity levels that can be utilized in accordance with various embodiments.

FIG. 3 illustrates an example process 300 for balancing resources among multiple resource pools in a multi-tenant environment that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, capacity targets for each of a set of resource pools are obtained 302, where those targets can include targets for total and/or free capacity for each pool. These targets can be based on forecast customer usage or other such factors as discussed elsewhere herein. At each of a plurality of different times, such as at regular intervals or otherwise, current pool capacity, usage, and other such data can be Obtained 304 and compared against the various targets. Using a pool balancing algorithm or other such approach, a set of one or more resources to be reconfigured can be determined 306, where the reconfiguring is intended at least in part to enable each pool to meet or exceed its respective targets for an upcoming period. The determined hosts can then be reconfigured 308, and after the reconfiguration period can be made available to customers in the appropriate pool. It should be understood that in some instances resources might be reconfigured without the resource ending up in another pool, etc.

User requests for capacity can be processed using the balanced resource pools. When a request is received 310, a determination is made 312 as to whether there is a sufficient amount of the type of capacity needed to process that request. If so, the request can be processed and the capacity allocated 314. If sufficient capacity is not available, or allocating the capacity will cause a respective resource pool to fall below a free capacity target, for example, a determination can be made 316 as to whether there are hosts not being used that can be reconfigured to provide such capacity. If so, the host(s) can be caused 318 to be reconfigured, such as by a rebuild service or other such component. If hosts or other resources are not available to be reconfigured, the request can be denied 320, and an ICE or other such exception returned in at least some embodiments.

Figure 4:
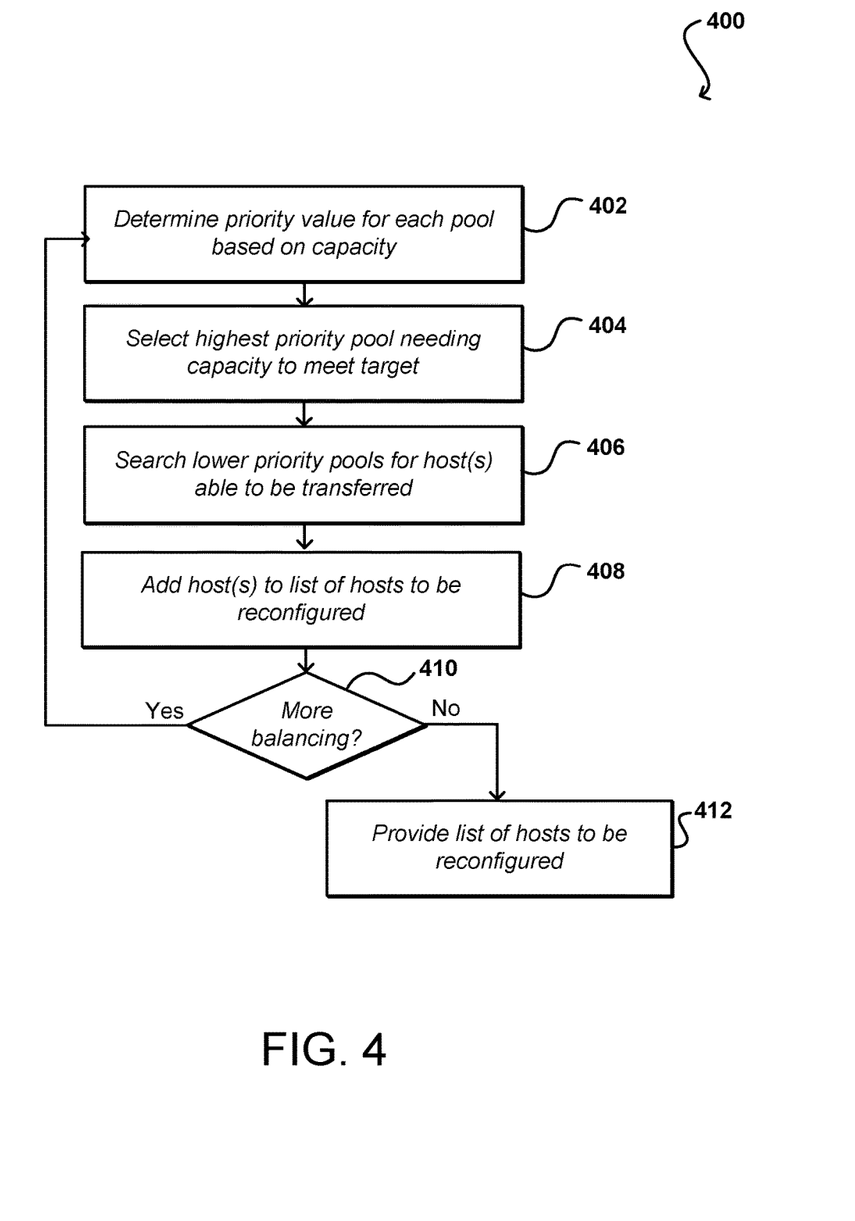
FIG. 4 illustrates an example process for adjusting capacity among resource pools using a pool balancing algorithm that can be used in accordance with various embodiments.

FIG. 4 illustrates an example process 400 for determining which hosts to proactively reconfigure that can be utilized in accordance with various embodiments. In this example, a pool balancing algorithm and/or process can determine 402 a priority value for each of the resource pools, using capacity, usage, or other such data for the pools. As discussed, pools below a forecast amount of free capacity might receive the highest priority values, while pools with excess total and free capacity might receive the lowest priority values, among other such options. In this example, the highest priority pool is selected 404 as a target pool, and the lower priority pools can be searched 406 to attempt to locate hosts that are able to be transferred to the target pool. In at least one embodiment, the process starts with the lowest priority pool and works up until an appropriate number of hosts can be found, or the process runs out of potential source pools. When a host is found, that host can be added 408 to a reconfigure list in order to be reconfigured and made available in the appropriate target pool. The priority values of the target and source pools can then be recalculated, such that the pool receiving capacity should have a lower priority score and the pool giving up capacity should have a higher priority score. An analysis can be performed to determine whether further balancing is needed 410, such as by determining whether any of the pools are still projected to not meet their targets. If so, the process can continue with the next highest priority pool, as long as there is at least one remaining potential source pool. Once the pools are sufficiently balanced or there are no more potential source pools from which to borrow capacity, the generated list of hosts to be reconfigured can be provided 412 to a rebuilding service or other such component.

As discussed, these and other methods can be managed and/or executed by a resource manager, alone or in conjunction with a number of components, services, modules, and/or systems. The performance of a resource manager can be monitored and evaluated using any of several different metrics, such that adjustments can be made and the operation of the manager optimized as appropriate. One important metric can include customer satisfaction. An indication of a level of customer satisfaction can be determined based at least in part based on the percentage of customers who received ICE messages due to imperfect capacity configuration. As discussed, a customer can receive an ICE message when the customer requests capacity and the request is denied due at least in part to a lack of capacity. Since a request for capacity specifies the amount of capacity requested, it is possible to verify whether the capacity was available in other pools. If the requested amount of capacity is available in other pools and that this capacity could have been reconfigured, the resource manager is responsible for the ICE. Only hosts that are unoccupied may be able to be reconfigured. Such hosts are referred to herein as fungible capacity. Only fungible capacity can be reconfigured in at least some embodiments. lithe requested amount of capacity is not available in other pools or if the capacity is not fungible, the resource manager is not responsible for the ICE.

Various factors can be taken into consideration when computing ICE metrics. For example, customers can make targeted calls or untargeted calls when requesting capacity. Targeted calls request capacity in a specific zone, while untargeted calls can request capacity in any zone within a region. Consequently, a given request can be more likely to receive an ICE if the request is targeted. It therefore can be more useful to compute two different ICE metrics: the percentage of customers receiving an ICE that made targeted requests and the percentage that made untargeted requests. The percentage of customers receiving an ICE can be computed with different levels of aggregation. At a highest level of aggregation, for example, a daily global percentage of customers receiving an ICE can provide a concise summary of performance. At lower levels of aggregation, the hourly percentage of customers receiving an ICE computed for each zone and each pool can help with researching root causes for low performance, and can help identify problems that are invisible when looking only at a high level aggregates.

Another metric that can be used to evaluate the performance of a resource manager is an amount of fungible capacity. The amount of fungible capacity can be determined in at least one embodiment by determining the average number of unoccupied slots on unoccupied hosts in all the pools contained in a given hardware family. Since slots in different pools have different costs, the number of slots can be weighted proportionally to the relative cost of instances in a pool. For instance, a relatively large instance might weight eight times more than an relatively small instance, since a host with a single large slot can be reconfigured into a host with eight small slots.

The performance of a resource manager can also be evaluated using the amount of unmet demand. The amount of unmet demand indicates how much capacity was requested by customers (or applications, etc.) but could not be provided. Since requests for capacity generally specify the number of instances requested, it is possible to approximately compute what the customer usage would have been, had the request been granted. Such an approximation can utilize heuristic to infer how long the customer would have used the capacity. The unmet demand can be computed as part of a forecasting process, and can be computed at the pool level, hardware family level, zonal level, or regional level, among other such options. As for fungible capacity, since slots in different pools have different costs, the number of slots can be weighted proportionally to the relative cost of instances in a pool.

Factors such as fungible capacity and unmet demand can be analyzed to determine various performance metrics for a resource manager. For example, if unmet demand is at zero then all demand can be determined to be satisfied and the resource manager is satisfying customer demand in an optimal, or at least acceptable, way. Other metrics are used to verify that any available fungible capacity is distributed judiciously among pools. If unmet demand is not zero and some fungible capacity is available, the resource manager could have allocated the fungible capacity more judiciously to meet demand but was not able to predict demand accurately enough or was not able to react quickly enough. More specifically, if the amount of unmet demand is lower than the amount of fungible capacity, the resource manager could have met demand, had it allocated the fungible capacity appropriately. A pool balancing algorithm thus can be adjusted, or a new pool balancing algorithm selected.

On the other hand, if the amount of unmet demand is higher than the amount of fungible capacity, there is not enough fungible capacity available for the resource manager to meet demand. There can be several possible causes for the lack of sufficient fungible capacity. For instance, it is possible that there is not enough physical capacity in the environment, or that there was a delay in expanding capacity or vetting the hardware. It is also possible that a large number of hosts experienced software failures, or that host provisioning or testing was delayed or broken. Further, customers could have been allowed to launch in a particular resource zone even though much more capacity was available in other zones, Similarly, the resource manager might have failed to properly deny the capacity requests of fraudulent customers, or might have enabled a customer with spiky usage patterns acquire too much capacity to the detriment of customers with a more stable usage pattern. Various other such causes can exist as well.

Additional metrics can be used to evaluate the performance of a resource manager and/or pool balancing algorithm in accordance with various embodiments. For example, a pending number of reconfigurations in progress indicates how often a resource manager initiates reconfigurations, how much capacity is in the process of being reconfigured, and how much time host reconfiguration takes. Such a metric can be used to monitor the impact of the resource manager on the amount of capacity that cannot be made available to customers because it is in the process of reconfiguring. A number of failed reconfigurations can be used to monitor the performance of the reconfiguration process. A current percentage of free capacity that is fungible capacity can be to monitor the impact of the resource manager on pool fungibility. A resource manager can set capacity targets for each pool, and the amount of missing capacity to meet a target can reflect how well the pool balancing algorithm is functioning. In at least some embodiments, low capacity tickets are filed automatically when capacity is low in a pool. If a resource manager functions as expected, low capacity tickets are filled in at least some embodiments only when no fungible capacity is available to resolve the capacity issue.

A resource manager can also be configured to recover from various types of failure and/or erroneous states or occurrences. In some embodiments, the automatic adjustment of capacity can be suspended if any of the dependencies of the resource manager fail, where those dependencies can include a rebuild service, an information service, a discovery service, etc. In some cases, the resource manager might be able to perform some type of remedial action. For example, if the forecasting service delivers erroneous total demand forecast or erroneous free capacity targets, the resource manager might add too much capacity in a pool or remove too much capacity from a pool. To reduce this possibility, the resource manager can monitor the forecast and generate alarms when the difference between the current forecast and the previous forecast exceeds a preset threshold. Services such as the capacity manager, host information service, and discovery service can provide information about host capacity. If these services provide erroneous data, the resource manager could add too much capacity in a pool or remove too much capacity from a pool. To reduce this possibility, the resource manager can utilize a low confidence forecast and a high confidence forecast as boundaries within which current demand should vary. If current demand goes below the low confidence forecast or above the high confidence forecast, the resource manager can generate an alarm so that an operator can investigate. In the case of the rebuild service, the resource manager can have a maximum rebuild velocity that prevents capacity from being reconfigured too rapidly. Additionally, the resource manager can be configured to generate alarms when reconfigurations exceed service level agreements, rules, or other such policies.

The resource manager can provide and/or utilize a simple API to get and modify pool configurations. The API might only be accessible through a webpage or interface to which only members of a capacity team, or other such authorized users, have access. It is possible that a malicious or inattentive user might modify the pool configurations of the resource manager, thereby setting the target capacity of a pool to an inappropriate value that can result in an excess or a lack of capacity in that pool. Consequently, the resource manager can be configured to keep a history or log of configurations changes made through the API, as well as an identifier for the user who made the changes.

A resource manager in at least some embodiments can run on multiple hosts in each resource zone, and can remain operational as long as at least one host is operational in that zone. Each zonal instance of the resource manager can be independent from the other instances. Accordingly, a resource manager can be deployed to one zone at a time such that the effect of the deployment of incorrect code to a zone is contained within that zone. Deploying erroneous resource manager code changes to production can adversely affect capacity availability. To identify erroneous code before deploying to production, the resource manager can provide and/or utilize multiple ways of testing code changes, as may include: unit tests using a simulated fleet and mock services, a zeta zone to test the resource manager using capacity dedicated to that purpose, and/or a gamma environment that makes read-only calls to the resource manager dependencies but no mutable calls.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device, Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections, However, it will be appreciated by those of ordinary skill in the art that such a system could operate equally well in a system having fewer or a greater number of components than are illustrated in FIGS. 1 and 2. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Ped, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing resource capacity in a multi-tenant environment, comprising:
    determining a total capacity target and a free capacity target for one resource pool of a plurality of resource pools, the one resource pool including a set of resources having a similar configuration, the total capacity target and the free capacity target each being calculated based at least in part upon a forecast usage by customers of the plurality of resource pools;
    comparing capacity data for the resource pool against the total capacity target and the free capacity target for the resource pool;
    when the capacity data for the resource pool does not satisfy at least one of the total capacity target or the free capacity target:
    determining at least one resource that can be moved from a source pool to a target pool of the plurality of resource pools to enable at least a portion of the plurality of resource pools to satisfy at least one of the total capacity target or the free capacity target; and
    causing the determined at least one resource to be reconfigured to provide capacity in the target pool;
    receiving a request for an amount and type of capacity in the multi-tenant environment;
    granting access to the amount and type of capacity in a respective pool when the amount and the type of capacity is available; and
    when granting the access causes the type of capacity of a respective pool to fall below the total capacity target or the free capacity target, reconfiguring the determined at least one resource to provide additional capacity of the type of capacity.

2. The computer-implemented method of claim 1, further comprising:
    denying the request when there is less than the amount of capacity of the type of capacity available for the request.

3. The computer-implemented method of claim 1, further comprising: determining that capacity is available, according to the type of capacity, when there are one or more empty slots on a host machine on which a customer instance can be instantiated.

4. The computer-implemented method of claim 1, further comprising: reconfiguring the determined at least one resource when all slots on a respective host machine are empty and not reserved for an upcoming period of time.

5. The computer-implemented method of claim 1, wherein the request for an amount and type of capacity is received to an application programming interface (API) of a web services component in the multi-tenant environment.

6. The computer-implemented method of claim 1, wherein the plurality of resource pools is distributed across a plurality of resource zones.

7. The computer-implemented method of claim 6, wherein the resource pool includes the set of resources with the similar configuration that is in a designated one of the resource zones.

8. A non-transitory computer-readable storage medium including instructions that, when executed by at least one processor of a computing system, cause the computing system to:
    determine a total capacity target and a free capacity target for one resource pool of a plurality of resource pools in a multi-tenant environment, the one resource pool including a set of resources having a similar configuration, the total capacity target and the free capacity target each being calculated based at least in part upon a forecast usage by customers of the plurality of resource pools;
    compare capacity data for the one resource pool of the plurality of pools against the total capacity target and the free capacity target for the one resource pool;
    when the capacity data for the one resource pool does not satisfy at least one of the total capacity target or the free capacity target, determine at least one resource that can be moved from a source pool to a target pool of the plurality of resource pools to enable at least a portion of the plurality of resource pools to satisfy at least one of the total capacity target or the free capacity target, and cause the determined at least one resource to be reconfigured to provide capacity in the target pool;
    receive a request for an amount and type of capacity in the multi-tenant environment;
    grant access to the amount and type of capacity in a respective pool when the amount and the type of capacity is available; and
    when granting the access causes the type of capacity of the respective pool to fall below the total capacity target or the free capacity target, reconfigure the determined at least one resource to provide additional capacity of the type of capacity.

9. The non-transitory computer-readable storage medium of claim 8, wherein the instructions that, when executed by the at least one processor of the computing system, further cause the computing system to: determine that capacity is available, according to the type of capacity, when there are one or more empty slots on a host machine on which a customer instance can be instantiated.

10. The non-transitory computer-readable storage medium of claim 8, wherein the instructions that, when executed by the at least one processor of the computing system, further cause the computing system to: reconfigure a resource when all slots on a respective host machine are empty and not reserved for an upcoming period of time.

11. The non-transitory computer-readable storage medium of claim 8 wherein the instructions that, when executed by the at least one processor of the computing system, further cause the computing system to: deny the request when there is less than the amount of capacity of the type of capacity available for the request.

12. The non-transitory computer-readable storage medium of claim 8, wherein the instructions that, when executed by the at least one processor of the computing system, further cause the computing system to receive the request for an amount and type of capacity via an application programming interface (API) of a web services component in the multi-tenant environment.

13. The non-transitory computer-readable storage medium of claim 8, wherein the plurality of resource pools is distributed across a plurality of resource zones.

14. The non-transitory computer-readable storage medium of claim 13, wherein the resource pool includes the set of resources with the similar configuration that is in a designated one of the resource zones.

15. A system comprising:
at least one device processor; and
memory including instructions that, when executed by the at least one processor, cause the system to:
determine a total capacity target and a free capacity target for one resource pool of a plurality of resource pools in a multi-tenant environment, the one resource pool including a set of resources having a similar configuration, the total capacity target and the free capacity target each being calculated based at least in part upon a forecast usage by customers of the plurality of resource pools;
compare capacity data for the one resource pool of the plurality of pools against the total capacity target and the free capacity target for the one resource pool;
when the capacity data for the one resource pool does not satisfy at least one of the total capacity target or the free capacity target, determine at least one resource that can be moved from a source pool to a target pool of the plurality of resource pools to enable at least a portion of the plurality of resource pools to satisfy at least one of the total capacity target or the free capacity target, and cause the determined at least one resource to be reconfigured to provide capacity in the target pool;
receive a request for an amount and type of capacity in the multi-tenant environment;
grant access to the amount and type of capacity in a respective pool when the amount and the type of capacity is available; and
when granting the access causes the type of capacity of the respective pool to fall below the total capacity target or the free capacity target, reconfigure the determined at least one resource to provide additional capacity of the type of capacity.

16. The system of claim 15, wherein the instructions when executed further cause the system to: determine that capacity is available, according to the type of capacity, when there are one or more empty slots on a host machine on which a customer instance can be instantiated.

17. The system of claim 15, wherein the instructions when executed further cause the system to: reconfigure a resource when all slots on a respective host machine are empty and not reserved for an upcoming period of time.

18. The system of claim 15, wherein the instructions when executed further cause the system to: deny the request when there is less than the amount of capacity of the type of capacity available for the request.

19. The system of claim 15, wherein the instructions when executed further cause the system to: receive the request for an amount and type of capacity via an application programming interface (API) of a web services component in the multi-tenant environment.

20. The system of claim 15, wherein the plurality of resource pools is distributed across a plurality of resource zones.

21. The system of claim 20, wherein the resource pool includes the set of resources with the similar configuration that is in a designated one of the resource zones.

* * * * *